March 5, 1968    O. W. BURKE, JR    3,372,046
SILICA PIGMENTS AND PROCESS FOR PRODUCING SAME
Filed May 24, 1965
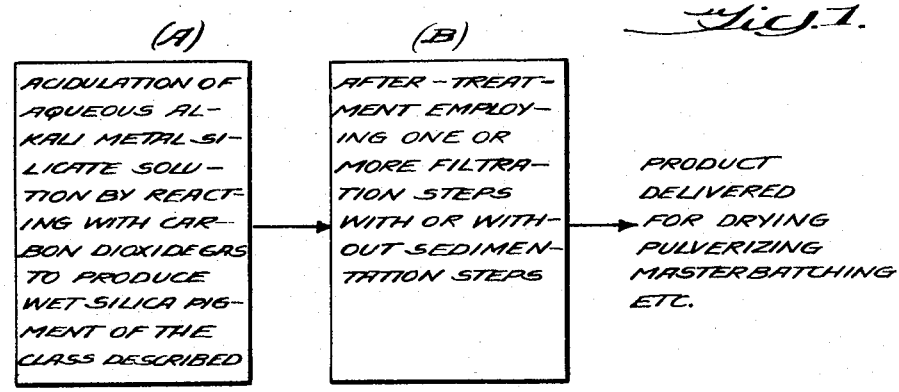
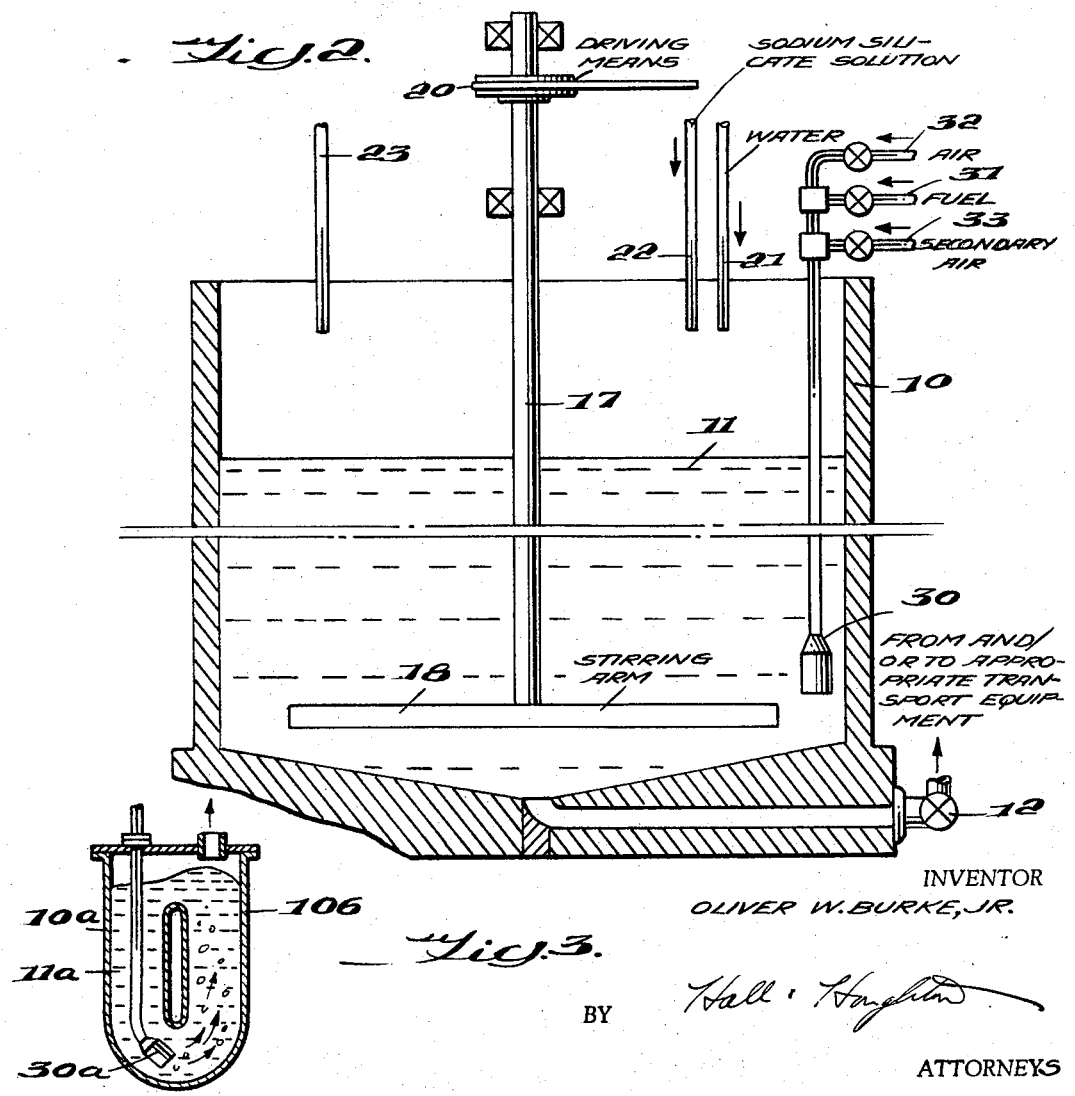
INVENTOR
OLIVER W. BURKE, JR.
BY
ATTORNEYS

United States Patent Office 3,372,046
Patented Mar. 5, 1968

3,372,046
SILICA PIGMENTS AND PROCESS
FOR PRODUCING SAME
Oliver W. Burke, Jr., 506 Intracoastal Drive,
Fort Lauderdale, Fla. 33306
Filed May 24, 1965, Ser. No. 458,132
20 Claims. (Cl. 106—288)

The invention herein disclosed and claimed relates to the production of silica pigments from an aqueous solution to alkali metal silicate, and aims particularly to produce wet silica pigments having improved characteristics.

Another object of the invention is to provide a wet silica pigment product having improved characteristics of filterability.

Still another object is to provide new and useful processes and arrangements for the production of such silica pigment and wet silica pigments.

Further objects and advantages of the invention will be apparent from the following general and specific descriptions of preferred embodiments of the invention considered in connection with the accompanying drawings wherein:

FIG. 1 is a typical flow sheet of the main procedures generally employed in the production of silica pigment via the acidulation of an aqueous alkali metal silicate solution and the subsequent handling and treatment of the wet silica pigment slurry produced by such acidulation.

FIG. 2 is a more or less diagrammatic representation, partly in vertical section, of one embodiment of various features of apparatus which may be employed in applying the present invention to such processes.

FIG. 3 is a more or less diagrammatic representation, partly in vertical section, of another form of such apparatus.

The invention resides in the novel products and in the new and useful process features herein disclosed, and is more particularly pointed out in the appended claims.

GENERAL DESCRIPTION

Wet silica pigments of the class precipitated from aqueous sodium silicate solution with the aid of carbon dioxide for the preparation of finely divided particulate silica pigment for the reinforcement of rubber, inter alia, are subjected to various after-treatments before drying and micropulverizing, e.g. washing and treatment with various chemical modifiers such as acid or metal salts, and such after-treatments generally include the subjecting of the slurry to one or more filtration steps with or without sedimentation steps.

The silica pigment slurries produced by known methods form quite dense filter cakes and are difficult to filter but this disadvantage has been regarded as inherent in the production of a silica pigment for rubber reinforcing and like purposes. See copending application Ser. No. 458,131, filed May 24, 1965, now Patent No. 3,337,299.

By the invention of my just mentioned copending application however, effective reinforcing pigments are produced, with the added advantage that as wet silica pigments they can be filtered and washed in much less time than heretofore required.

The present invention is a further improvement of the invention of said copending application, and provides for obtaining of advantages thereof, and of other advantages, by the contacting of the solution and/or slurry being acidulated, preferably maintained at an average temperature of 80±10° C., with gas comprising carbon dioxide at a temperature above the critical temperature of water 374° C. Furthermore in a preferred embodiment of the present invention the said contacting is effected with a submerged combustion burner, preferably with the flame thereof contacting the solution. In one embodiment, the burner may be operated with a hydrocarbon rich flame and may impart constituents to the pigment which are retained therein during filtration and washing. In another it may employ excess air and the contacting may be effected with hot gas comprising carbon dioxide, nitrogen, oxygen and superheated steam all at a temperature above the critical temperature of water.

Thus the present invention resides primarily in the discovery and disclosure of wet silica pigments which may have substantially augmented filterability and/or other advantages compared to those of the prior art, and in the discovery and disclosure of process improvements and arrangements for producing the same, and in preferred embodiments of the latter.

As indicated in FIG. 1 of the drawing, known processes for preparing silica pigments involve two steps of processing:

(A) Sodium silicate is converted to wet silica pigment by acidulating it in aqueous solution, as by mixing the same with carbon dioxide. This procedure conventionally is effected with the vigorous agitation usually employed for effecting gas and liquid contact, e.g. by use of a turbo agitator or the like (see Thornhill, U.S. Patent 2,940,830; col. 5, line 46; col. 26, lines 16, 18, 35, and 40; col. 29, line 71; col. 32, line 53, etc.).

(B) The resulting wet silica pigment is then freed of electrolyte and/or alkalinity, after-treated, and recovered, which procedures conventionally involve one or more filtration steps; and as above noted, such filtration step or steps conventionally are time consuming operations since separating and washing of the wet silica pigment produced by the known processes is very slow, particularly where the pH of the slurry is below about 5. (See Allen U.S. Patent 2,924,510, col. 1, line 45.)

The present invention primarily resides in the discovery of a process similar to but in some respects more advantageous than that of said copending application in which in Step A a wet silica pigment can be produced which has a novel structure such that it is filterable with greater ease and rapidity than those known to the art prior to these processes, which improved filterability may be quantitatively measured or evaluated by comparison with suitable controls. Secondly the invention resides in the discovery of specific improvements involving submerged combustion, and involving new and useful cordination thereof with the procedures of Stages A and/or B, and also the use thereof to impart particular constituents to the pigment produced.

Thus the invention primarily resides (1) in the discovery that advantages of the copending and this invention may be achieved by conducting Step A, with the aid of gases having a temperature above the critical temperature of water and that these gases can effect adequate gas and liquid contact and can establish conditions of mixing which avoid vigorous agitation and the shearing of the materials effected thereby to such an extent that, as disclosed by this invention, a wet silica pigment structure is produced which has improved filterability.

The invention has additionally disclosed (2) that the solution or slurry may with advantage be kept at 80±10° C. while contacting it with gases having temperatures above 374° C.; (3) that this process of gas agitation with such hot gases can effect a continuous concentration of the solution being acidulated, which affects the formation of the aggregates and flocs forming the pigment; (4) that such continuous concentration can be offset in whole or in part by water addition if desired; (5) that such hot gas contacting and gas agitation can be effected concurrently with low shear stirring while still achieving desired results.

Furthermore, the invention resides in the discovery (6) that the wet silica pigment structure produced by the present process during re-slurry or re-pulping of the wet silica pigment, and during the transportation thereof from Step A to and through Step B, can be preserved so that its good filterability may be taken advantage of during Step B.

Also, the invention resides in the discovery (7) that certain of its advantages can be achieved by applying the improvement in Step A following first appearance of precipitate in the aqueous solution, and more especially following the appearance of a Tyndall effect therein, as well as throughout Step A. Also the invention resides in the discovery (8) that where after-treatment with carbon dioxide is to be practiced, as in copending application Ser. No. 422,456, now Patent No. 3,281,210, such may advantageously be practiced with gas having a temperature greater than 374° C., and especially with flame contact with submerged combustion. Finally, the invention resides in the provision of wet silica pigments having structures resulting from contacting them at 80±10° C. with hot gases and dry steam at over the critical temperature of water, which are clearly distinguished by better filterability and other characteristics from the wet silica pigments of the prior art. Different embodiments may involve different ones of the aforesaid advantages.

The test employed herein to measure the filterability of the product and distinguish it from the control product is set forth in Table A hereinafter.

Referring now to FIG. 2 of the drawings, there is illustrated therein an example of equipment suitable for the performance of Step A and for the performance of those parts of Step B which are applied to the slurry produced by Step A or to re-slurried wet silica pigment. In this form the equipment comprises a reactor vessel 10 for holding the substantial volume 11 of solution being treated. The reactor preferably has a sloping bottom and means for withdrawing therefrom the wet silica pigment slurry from Step A or form the aforesaid parts of Step B shown as a valved passage 12 which may be connected to low shear transport equipment such as an airlift or low shear pump for delivering the slurry to any other equipment used to practice Step B. When the reactor of FIG. 2 is used in Step B, the low shear transport equipment may deliver transported or re-slurried silica pigment to the reactor 10 in any suitable way, e.g. via the same valved passage 12.

The carbon dioxide at a temperature of over 374° C. for reaction in Step A is supplied to and distributed in the reactor 10 in any way which does not subject the solution to high shear. In the preferred form of the invention this is achieved by operating a submerged combustion burner 30 immersed in the contents 11 of the reactor vessel 10. In the form shown in FIG. 2, the burner is supplied with hydrocarbon fuel through a valved fuel passage 31, and with primary combustion air through a passage 32, provision also preferably being made for supply of secondary air through a conduit 33, the conduits 32 and 33 also preferably being valved to enable adjustment of the flame to a hydrocarbon rich state or to contain excess air, as desired for particular embodiments of the invention.

Where desired, because of reactor dimensions, or number of burners, or for other reasons, low shear mixing means may be and preferably is provided shown as a slow speed stirrer 17 having a relatively narrow elongated stirrer arm or rod 18 and driven at a suitable slow speed by appropriate driving means 20. In a reactor of 3-foot inside diameter, an arm 18, which is 6 inches above the tank bottom and 2½ feet long by 1½ inches high in cross-section, and which is driven at 50 r.p.m., has been found to give sufficiently low shear stirring. Means 21 for supplying water and means 22 for supplying aqueous sodium silicate are provided. Also means for supplying treating reagent, shown as a conduit 23, may be provided when other liquid materials are to be supplied as above set forth.

When pressure or vacuum is to be employed in after-treating or in effecting transport of materials, the reactor may be closed and may be provided with a further valved inlet and outlet means (not shown) for evacuation, pressurizing and relief purposes. When the reaction is to be effected at elevated temperatures, the reactor may be suitably heated, as by a steam coil or other heating means. In the preferred embodiments herein disclosed, the hot gases from the immersed submerged combustion burner can maintain the charge 11 at an average temperature of 80±10° C. as hereinafter set forth. In the form of FIG. 3, the charge 11a being treated is circulated through downflow and upflow chambers 10a and 10b intercommunicating at their upper and lower ends, and the submerged combustion burner is located to discharge its products of combustion in a position to pass upwardly through said upflow chamber and effect an airlift action therein for promoting cyclical flow of said solution through said intercommunicating chambers and circulatory mixing thereof.

Bearing in mind the principal aspects of the invention above enumerated, and the illustrative equipment just described, the practice of the invention will be made clearly evident by the following examples of specific embodiments thereof, which examples, however, are illustrative and not restrictive of the invention. Thus the invention may be applied with advantage in the preparation of finely divided siliceous pigments for various purposes, e.g. those suitable for the reinforcement of rubber and/or plastic materials, those used for pigmentation of paper, etc., in the absence of or presence of non-acidulating electrolytes or treating materials such, for example, as the electrolytes or metal salts of copending applications Ser. No. 422,454, now U.S. Patent No. 3,325,249, and Ser. No. 422,455 filed Dec. 30, 1964, now abandoned.

EXAMPLES

*Example 1*

A 270-gallon reactor equipped with a driven 50 r.p.m. low shear stirring arm as described in connection with FIG. 2 was charged with 144 kilograms of commercial 41° Bé. sodium silicate containing 200 moles of the composition expressed by the formula $Na_2O/(SiO_2)_{3.22}$ and diluted with 630 liters of water and this charge was heated to 80° C. While the solution was held at 80±10° C. a submerged combustion burner supplied with propane and air was ignited and submerged below the surface of the sodium silicate solution. The submerged combustion burner operated at a relatively constant rate so that after 150 minutes the acidulation had progressed to 34%, i.e. 68 moles of carbon dioxide had been absorbed by the sodium silicate solution. At this point the blue color of the Tyndall effect was noticeable and at this time 150 liters of water were added.

The acidulation at 80° C. was continued for 643 minutes with the aid of the submerged combustion burner until after a total of 793 minutes the acidulation had reached 125%, i.e. 250 moles of carbon dioxide had been absorbed by the silica slurry. Throughout the formation of the silica slurry the slow speed, low shear stirrer was used, and from time to time water was added to compensate for the loss thereof due to operation of the burner.

A 200-gram sample of the resulting slurry was set aside and called silica 1–A for the comparative test of filtration time set out in Table I. The rest of the wet silica pigment was filtered and washed until the filtrate had a resistivity of 1550 ohm/cm. and was designated silica 1–B.

To a 7646-gram portion of silica 1–B having 7.9% total solids and a pH of 8.2 was added 120 ml. of 10% sulfuric acid and the resulting pH was 4.0. This acidified silica slurry was filtered, washed and the filter cake dried at 105° C., micropulverized, and designated silica 1–C.

Example 2

A 270-gallon reactor equipped with a driven 50 r.p.m. low shear stirring arm as described in connection with FIG. 2 and a 6" diameter propeller stirrer driven at 650 r.p.m., was charged with 137 kilograms of commercial 41° Bé. sodium silicate containing 200 moles of the composition expressed by the formula $Na_2O/(SiO_2)_{3.22}$ and diluted with 630 liters of water and this charge was heated to 80° C. The propeller was located at about mid depth in the reactor and near the wall with the pitch of the blades directing the material to the bottom of the reactor where the slow speed, low shear rotary arm agitator was located. The acidification was initially supplied from a carbon dioxide cylinder and fed at relatively constant rate through a tube to a position just above the propeller stirrer.

After 135 minutes the acidulation had reached 28% which represented an absorption of 56 moles of carbon dioxide by the sodium silicate solution. At this time the blue color of Tyndall effect was noticed and 150 liters of water were added and the tank carbon dioxide acidulation continued for 205 minutes. At this total acidulation time of 340 minutes the acidulation had reached 74% which meant 148 moles of carbon dioxide had been absorbed by the sodium silicate solution and its precipitate.

The carbon dioxide supply from the tank was shut off and replaced by the submerged combustion burner operating at a relative constant rate. The hydrocarbon gas burned in the submerged combustion burner was propane. The burner was run for 320 minutes during which time the propeller stirrer was not running, however, the slow speed, low shear stirrer arm was rotated at 50 r.p.m. After a total acidulation time of 660 minutes the acidulation had reached 140%, 280 moles of carbon dioxide had been absorbed.

Here again, a 200-gram sample of the slurry was set aside as silica 2–A, and the rest of the wet silica pigment was filtered and washed until the filtrate had a resistivity of 1000 ohm/cm. and was designated silica 2–B.

To a 4000-gram portion of silica 2–B having a total solids of 7.0% and a pH of 9.0 was added 92 ml. of 10% sulfuric acid and the pH dropped to 3.5. This acidic silica slurry was filtered, washed and the filter cake dried at 105° C., micropulverized and designated silica 2–C.

Example 3

A 270-gallon reactor equipped with a driven 50 r.p.m. low shear stirring arm as described in connection with FIG. 2 and a propeller stirrer driven at 650 r.p.m. as described in connection with Example 2, was charged with 141 kilograms of commercial 41° Bé. sodium silicate containing 200 moles of the composition expressed by the formula $Na_2O/(SiO_2)_{3.22}$ and diluted with 630 liters of water and this charge was heated to 80° C.

This example was carried out like Example 2 with 150 liters of water added at the Tyndall effect which became noticeable after 150 minutes, i.e. at an acidulation of 30%, and the carbon dioxide was supplied for 600 minutes from tanks until the acidulation had reached 110% or 220 moles of carbon dioxide had been absorbed by the sodium silicate. From 110% to 138% acidulation the carbon dioxide was supplied solely from the submerged combustion burner which took 180 minutes making the total acidulation time 780 minutes, and during this period the temperature of the slurry remained at 80±5° C.

In this example the propeller stirrer was turned off prior to commencement of acidulation with the submerged combustion burner.

Once more a 200-gram sample was set aside as silica 3–A, and the rest of the wet silica pigment was filtered and washed until the filtrate had a resistivity of 1400 ohms/cm. and was designated silica 3–B.

To a 4000-gram portion of silica 3–B having a total solids of 9.7 was added 1 liter of water and the pH was 8.5, and to this silica slurry was then added 100 ml. of 10% sulfuric acid which resulted in a pH of 3.5. This silica slurry was then filtered, washed, dried at 105° C., micropulverized and designated silica 3–C.

Example 4 (comparative)

This silica was prepared in a manner exactly similar to Example 3 except there was no aftertreatment with the submerged combustion burner.

Thus the 270-gallon reactor equipped with the slow speed, low shear stirrer and the propeller agitator and the 200 moles of sodium silicate 41° Bé. as represented by the formula $Na_2O/(SiO_2)_{3.22}$ was acidulated at 80° C. with tank carbon dioxide at a relative constant rate to an acidulation of 100% which represented that 200 moles of carbon dioxide had been absorbed in forming the silica pigment.

In this example as in Example 3 at the appearance of the Tyndall effect at 30% acidulation the sodium silicate solution was diluted with 150 liters of water.

The silica slurry produced by this example was designated as silica 4–A for the comparative filtration test, as set forth in Table I.

Comparative filtration tests

The 200-gram samples of wet silica slurry 1–A, 2–A, 3–A and 4–A were each filtered and washed with 5 increments of 100 ml. each of wash water each added as the cake became free of surface water but before the cake cracked, an such washing raised the resistivity of the filtrate in each instance to approximately 1000 ohms/cm. This filtering and washing was effected using a vacuum of 25±2 inches of mercury, and in each instance the total time required for the initial filtration and the five increments of washing was tabulated and these tabulations are set out in Table I.

TABLE I

| Silica No. | Reaction Time (Min.) | Submerged Combustion Burner | Filtration Time (Min.) | Filter Cake Dry Solids (grams) |
|---|---|---|---|---|
| 1–A | *793 | Throughout | 7.33 | 10.1 |
| 2–A | *340/320 | After 75% acid | 13.85 | |
| 3–A | *600/180 | After 100% acid | 12.30 | 9.6 |
| 4–A (Comp.) | 600 | None | 31.42 | 8.7 |

*Minutes submerged combustion burner operated.

From the data tabulated in Table I it is apparent that as compared with the control Example 4–A the practice of the present invention after the silica had been precipitated, with the burner started when acidulation had reached 100% or 75% of the stoichiometric amount (Examples 3 and 2), increased the rapidity of filtration over 2-fold, while practice of the invention throughout the acidulation increased the filterability of the wet silica pigment over 4-fold.

Similar increases in filterability and other advantages are realized when the present invention is used in the treatment in Step B of silica pigments, i.e. siliceous pigments, which have been prepared with the aid of non-acidulating electrolyte, and/or heavy metal salts, either during the precipitation of the pigment in Step A or in the after-treatment thereof in Step B. Thus in certain instances it will be found advantageous in Step B to substantially free the siliceous pigment from water soluble electrolyte, e.g. by filtration and/or decanting and washing, down to a content of less than 5% and preferably less than 2%, dry solids basis, and to then treat the same in accordance with copending application Ser. No. 422,456 (Case 43+ATCD) but at a temperature of the order of 80° C. with the aid of the submerged combustion burner, or in accordance with copending application Ser. No. 422,455 (Case 43+ATM) but again at an elevated temperature of the order of 80° C. and in the presence of carbon dioxide and other gases introduced at a temperature above the critical temperature of water, e.g. by use of the submerged combustion burner. When the bound alkali metal of a silica prepared from sodium silicate has been replaced by an alkaline earth metal capable of forming basic or normal carbonate, e.g. magnesium, calcium, or barium, then the treatment thereof at the elevated temperature with the carbon dioxide, especially at the temperature produced by the submerged combustion burner, yields new and useful siliceous pigment materials containing such carbonates, viz: as illustrated in Examples 5–7.

*Example 5*

A 16000 gram portion of silica 1–B is slurried with 4 liters of water and then reacted by boiling for several hours with 52 grams of calcium chloride dissolved in 1 liter of water, and the resulting reaction mixture is then maintained at 80°±10° C. and treated with carbon dioxide at above 374° C., by operation of an immersed submerged hydrocarbon combustion burner therein, conveniently for a period of several hours. The resulting pigment is filtered, washed, dried and micropulverized and contains intimately incorporated calcium carbonate.

*Example 6*

Repetition of Example 5 employing an equivalent amount of barium chloride in lieu of the calcium chloride, yields a silica pigment containing intimately incorporated barium carbonate by use of the burner.

*Example 7*

Repetition of Example 5 employing an equivalent or excess amount of alkaline earth metal salts, i.e. 10 liters of sea water, in lieu of the calcium chloride, yields a silica pigment containing inter alia intimately incorporated carbonate of calcium and magnesium resulting from the use of the burner.

When any of the foregoing examples are carried out employing a hydrocarbon rich flame in contact with the slurry of wet silica pigment, the pigment produced shows the presence of constituents derived from cracked hydrocarbon, which are retained by the pigment during the filtration, washing, and drying thereof. The presence of such constituents, which can impart oleophyllic character to the pigment, has been determined by the darkening of the silica containing the same on decomposition thereof at elevated temperatures.

In similar manner, other materials which can be generated in or passed through the flame can be imparted to the silica pigment produced.

The procedures of each of Examples 1, 2 and 3 resulted in a wet silica pigment of the class which is precipitated from aqueous alkali metal silicate solution with the aid of carbon dioxide in the preparation of finely divided particulate silica pigment for the reinforcement of rubber, and each wet silica pigment, when subjected to similar after-treatments, effected good rubber reinforcement. Thus, the silica pigments 1–C, 2–C and 3–C were each compounded with SBR–1502 in accordance with the compounding recipe given in Table II.

TABLE II

| Compound ingredients: | Quantities (wt. parts) |
|---|---|
| Butadiene-styrene copolymer (SBR–1502) | 100 |
| Silica pigment material | 50 |
| Antioxidant: | |
|    2,2 - methylene - bis(4 - methyl - 6 - t.-butylphenol) (Antioxidant 2246) | 2.0 |
| Triethanolamine | 1.0 |
| Paracoumarone-indene resin (Cumar MH 2½) | 2.5 |
| Reogen | 5.0 |
| Zinc oxide | 5.0 |
| Magnesium oxide | 4.0 |
| Di-2-benzothiazyl disulphide (Altax) | 0.75 |
| N,N'-di-o-tolylguanidine (DOTG) | 1.1 |
| Sulfur | 2.0 |

In compounding the stock the selected silica pigment material was milled into the SBR–1502 together with the antioxidant and other compounding ingredients and the stock was aged overnight and then remilled and cured for 120 minutes at 287° F.

The vulcanizates were then tested and the physical properties thereof were determined as set forth in Table III.

TABLE III.—SILICA PIGMENT EVALUATION

| Silica No. | Hardness (Shore A) | Mod. 300% (p.s.i.) | Ult. Tensile (p.s.i.) | Elong. (Percent) |
|---|---|---|---|---|
| 1–C | 58 | 625 | 3,600 | 685 |
| 2–C | 68 | 615 | 4,160 | 740 |
| 3–C | 56 | 480 | 3,645 | 765 |
| Hi-Sil 233* | 58 | 560 | 3,530 | 700 |

*Commercial reinforcing silica pigment compounded and cured in same manner for comparison.

The silica product as wet filter or centrifuge cake may be masterbatched with latices of natural or synthetic elastomers and/or plastomers.

The silica pigments contemplated herein are at least for the most part comprised of silica. They usually comprise a few percent of free water removable by heating at 105° C. and a few percent of bound water removable by heating at over 1000° C. They may contain a small amount of bound alkali or other metallo-ingredients introduced as above set forth. Thus the term silica pigment contemplates not only the pigments comprised solely of $SiO_2$ but also the siliceous pigments containing proportions of other constituents. For example when the sulfuric acid in Examples 1–3 is replaced by sufficient aluminum salt, e.g. aluminum sulfate to give a pH of about 4 to 4.5, the resulting pigments on evaluation in vulcanizates in the manner just described are substantially equal or superior in balance of properties to the silicas 1–C, 2–C and 3–C.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalents of the claims are intended to be included therein.

I claim:

1. A silica pigment which has been prepared by contacting an aqueous solution of alkali metal silicate having a temperature of 80±10° C. with dilute carbon dioxide having a temperature in excess of 374° C. derived from a hydrocarbon rich flame, said pigment containing constituents derived from the cracking of hydrocarbon in the hydrocarbon rich flame and retained by the pigment during filtering and washing.

2. A silica pigment which has been prepared by contacting an aqueous solution of alkali metal silicate having a temperature of 80±10° C. with a mixture of hot gaseous combustion products of hydrocarbon comprising carbon dioxide all at a temperature in excess of 374° C.

3. In a process for preparing a silica pigment which includes the steps of
(a) mixing an aqueous alkali metal silicate solution and carbon dioxide to form a slurry of wet silica pigment, the improvement which consists in:
(b) conducting at least the latter part of the mixing in step (a) at least in part by introducing hot gaseous combustion products of hydrocarbon comprising carbon dioxide into the solution at a temperature in excess of 374° C.

4. A process as claimed in claim 3, wherein the average temperature of the slurry during the practice of step (b) is maintained at 80±10° C.

5. A process as claimed in claim 3, wherein the amount of water present during step (b) is gradually reduced by the gases effluent from step (b).

6. A process as claimed in claim 3, wherein water is added during the practice of step (b) equivalent to that removed by the gases effluent from step (b).

7. A process as claimed in claim 3, wherein the mixing during step (b) is conducted solely by agitating with said hot gases.

8. A process as claimed in claim 3, wherein the mixing during step (b) is conducted at least in part by low shear mechanical stirring.

9. In a process for preparing a silica pigment which includes the steps of
 (a) mixing an aqueous alkali metal silicate solution and carbon dioxide to form a slurry of silica pigment,
the improvement which consists in:
 (b) conducting at least the latter part of step (a) by operating a submerged combustion burner immersed in said solution.

10. A process as claimed in claim 9, wherein said submerged combustion burner is operated with its flame in contact with said solution.

11. A process as claimed in claim 9, wherein said burner is operated with a hydrocarbon rich flame.

12. A process as claimed in claim 9, wherein said burner is operated with an excess of air.

13. A process as claimed in claim 9, wherein the solution in step (a) is circulated through downflow and upflow chambers inter-communicating at their upper and lower ends, and wherein said submerged combustion tube burner is located to discharge its products of combustion in a position to pass upwardly through said upflow chamber to effect an airlift action therein for promoting cyclical flow of said solution through said intercommunicating chambers and circulatory mixing thereof.

14. In a process for preparing a silica pigment which includes the steps of
 (a) mixing an aqueous alkali metal silicate solution and carbon dioxide to form a slurry of silica pigment containing bound alkali, and
 (b) subjecting the resulting slurry to chemical reaction to reduce the bound alkali content thereof,
the improvement which consists in
 (c) conducting at least a part of step (b) by operating a submerged hydrocarbon combustion burned immersed in the slurry produced by step (a).

15. A process as claimed in claim 14 in which during step (b) the slurry is substantially freed of water soluble salts and step (c) is conducted at least in part thereafter.

16. A process as claimed in claim 15 in which a heavy metal salt is added during step (b).

17. In a process for producing a silica pigment which includes the step of
 (a) acidulating an aqueous alkali metal silicate solution by mixing carbon dioxide therewith before and after the precipitation of silica pigment therein,
the improvement which consists in
 (b) conducting the acidulation in step (a) by low shear mechanical stirring and by operating a submerged hydrocarbon combustion burner immersed in the solution, and
 (c) maintaining said solution at an average temperature of 80±10° C. during said acidulation.

18. A process as claimed in claim 15, wherein the operation of the immersed submerged combustion burner is terminated when the solution contains alkali metal carbonate and alkali metal bicarbonate.

19. A process as claimed in claim 15, wherein the operation of the immersed submerged combustion burner is terminated when the solution contains alkali metal carbonate and alkali metal bicarbonate in greater proportion than said alkali metal carbonate.

20. A process as claimed in claim 18, wherein the wet silica pigment produced by step (b) is substantially freed of water soluble electrolyte and treated with sufficient aluminum sulfate to reduce the pH thereof to the range of 4 to 4.5.

References Cited

UNITED STATES PATENTS 3,085,861   4/1963   Thornhill et al. _____ 106—288

TOBIAS E. LEVOW, *Primary Examiner.*

J. E. POER, *Assistant Examiner.*